Patented June 1, 1943

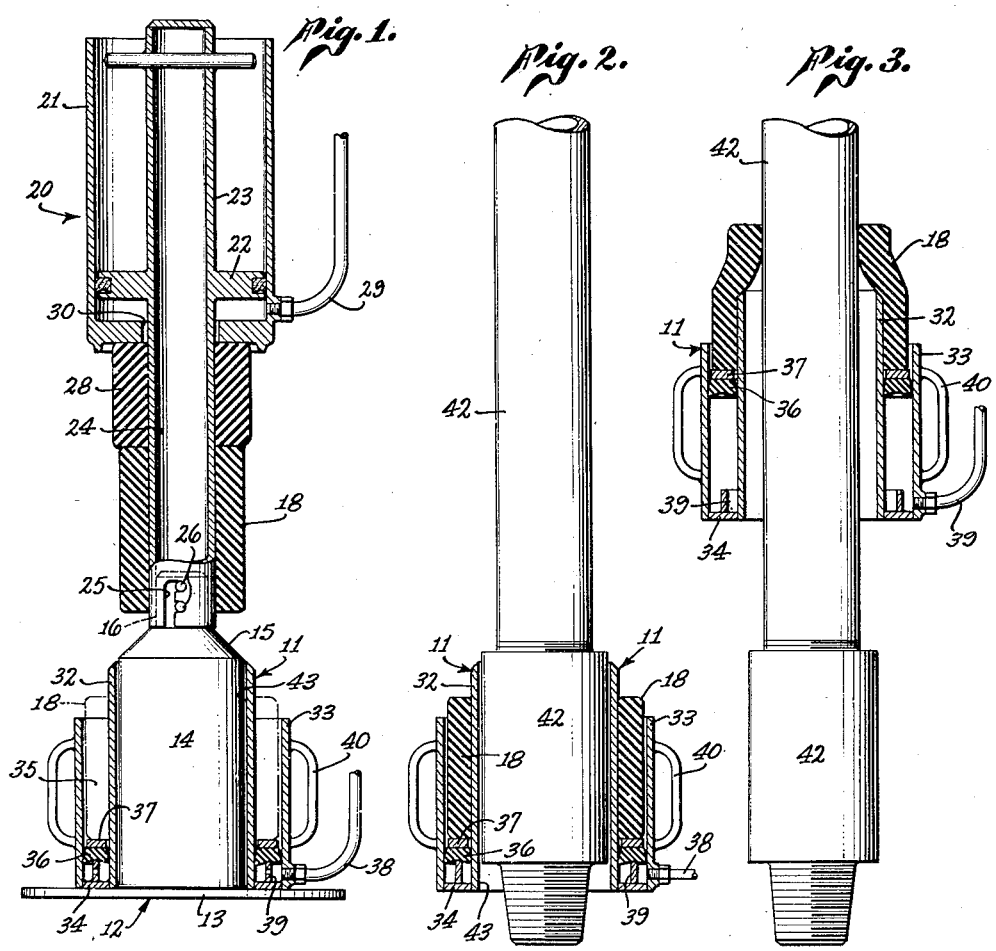

2,320,553

UNITED STATES PATENT OFFICE 2,320,553

MEANS FOR POSITIONING EXPANSIBLE COLLARS ON PIPE OR THE LIKE

Byron H. Barnes, San Marino, and Burt S. Minor, Whittier, Calif., assignors, by mesne assignments, to B. H. Barnes and Harriet C. Barnes, both of San Marino, Calif.

Application July 25, 1939, Serial No. 286,410

2 Claims. (Cl. 29—88.2)

This invention relates generally to apparatus for applying expansible collars to members having a larger diameter than the bore of the collar. More particularly, the invention relates to apparatus for applying rubber collars known as protectors to drill pipe in the drilling of oil wells and the like.

It is the present practice in the oil industry to use heavy and cumbersome apparatus at the well for the installation of the expansible rubber collars on the suspended drill pipe. The apparatus used for the installation of the rubber collars interferes with and slows up the drilling operation for the reason that the collars are put on each stand of pipe just prior to running it in the hole. The apparatus also takes up valuable space on the derrick floor. The present apparatus with which we are familiar is either too heavy or not adaptable for use in applying the collars to pipe which is horizontally disposed.

Therefore it is a primary object of this invention to provide a new and improved method and means for installing expansible collars such as rubber protectors on objects such as drill pipe, at any desirable place regardless of the position of the pipe. In this connection it is an object of this invention to provide a method and means for installing expansible collars on pipe which is in either a vertical or horizontal or some intermediate position.

It is also an object of this invention to provide apparatus for installing expansible collars on pipe without having to position and manipulate the pipe or without exerting any longitudinal or axial force on the pipe, thereby eliminating the necessity of supporting the pipe against longitudinal movement. In this connection it is a particular object to provide apparatus which will install an expansible collar at any point on the pipe without sliding the collar directly on the surface of the pipe thereby preventing damage to the collar.

It is also an object of this invention to provide apparatus with which it is possible to easily and speedily install a plurality of expansible collars on pipe. It is a further object to provide means whereby the collars may be installed at a point away from the derrick and thereby provide means for installation which will not in any way interfere with the normal drilling operations.

These and other objects will be apparent from the drawing and the following description thereof. Referring to the drawing which is for illustrative purposes only;

Fig. 1 is a sectional elevation of the apparatus of this invention;

Fig. 2 is an elevation of one end of a drill pipe showing the apparatus of this invention for positioning the expansible collar over the pipe;

Fig. 3 is a view similar to Fig. 2 but showing the apparatus of the invention at a different point on the pipe and showing the collar being mounted on the pipe.

More particularly describing the invention, reference numeral 11 generally indicates an annular cup member or sleeve. Associated with the cup member is what will be termed a base support 12 comprising a base plate 13, an upwardly extending cylindrical portion 14, a conical portion 15 and a top portion 16. The base support 12 is adapted to receive the annular cup member 11 as shown for the purpose of mounting an expansible collar 18 in the cup member.

Adapted to be detachably secured to the top portion 16 of the base member is an apparatus generally indicated by reference numeral 20 for applying force to the collar 18 to cause it to move downwardly over the conical portion 15 and into the annular cup member 11 to the position in which it is shown in broken lines in Fig. 1. This apparatus 20 may be of any suitable type, however, for the purpose of illustration we have shown apparatus of the type disclosed and claimed in the application of Burt S. Minor on Hydraulic expander and applicator for short elastic tubes, Serial No. 161,599, filed August 30, 1937, and reference is hereby made to that application for details of construction.

Generally the apparatus 20 comprises a cylinder 21 in which there is mounted a piston 22 having upper and lower tubular extensions 23 and 24 respectively. In this form of the invention the lowermost tubular extension 24 is provided with locking slots 25 to accommodate pins 26 on the top portion 16 of the base support 12. Adapted to be mounted on the tubular extension 24 is the expansible collar 18 which is to be forced into the cup member 11 and a follower member 28.

In the operation of the device a pressure fluid is introduced into the cylinder through the conduit means 29 thereby forcing the cylinder downwardly with relation to the piston 22 causing the follower member 28 to force the expansible collar 18 into the annular cup member 11. During this operation fluid from the cylinder escapes through the opening 30 to the interior of the members 18 and 28 thereby facilitating expansion of the member 18.

Referring particularly to the cup member 11, this member comprises an inner wall portion 32 and an outer concentric wall portion 33 which are connected by the intermediate joining annular wall portion 34. This construction forms an annular cup shaped member having an annular chamber 35 which is open at one end and closed at the other. This chamber is adapted to accommodate an annular flexible rubber piston 36 and above this an annular plate 37. Provision is made for the introduction of a pressure fluid in the region of the closed end of the annular cup member such as by means 38. In order to insure the pressure fluid being introduced between the piston 36 and annular wall portion 34, an annular stop ring 39 is provided to prevent the piston 36 from getting too close to the end of the cup member. For convenience in handling, the cup member is provided with handles 40.

The outer wall portion 33 of the cup member has been made shorter than the inner wall portion in order to act as a stop member for the follower member 28 during application of the expansible collar to the cup member.

In operation, the annular cup member is positioned on the base support 12 and the apparatus 20 attached to the base support and operated to force the expansible collar 18 into the cup member. The apparatus 20 is then detached from member 12 and the cup member 11 with its contained expanded collar is removed and positioned over the end of the pipe to which the expansible collar is to be applied such as shown in Fig. 2, the pipe being indicated by reference numeral 42. In this connection it is to be pointed out that the bore 43 or internal diameter of the annular cup member 11 is made larger than the largest diameter portion of the pipe over which the cup member must pass. The cup member is then positioned to the proper point on the pipe as indicated in Fig. 3 and pressure fluid introduced into the closed end of the cup member. This pressure fluid forces the piston 36 and ring 37 toward the open end of the cup member, thereby forcing the collar 18 out of the cup member and on to the pipe. It has been found that it is unnecessary to force the collar all the way out of the chamber 35 inasmuch as when the collar has been forced to the approximate position in which it is shown in Fig. 3 it will draw itself out of the cup member by its inherent contractive force, forcing the cup member away from it. Soapy water may be used as a lubricant for the expansible collars.

It is contemplated that the cup member 11 might be elongated in order to accommodate a plurality of expansible collars. With such a construction it would be possible to position several collars on a section of pipe without reloading the cup member.

Although the invention has been shown and described as taking particular forms, it is contemplated that the exact constructions might be changed without departing from the scope of the invention and it is intended to cover such changes as come within the claims.

We claim as our invention:

1. A device for installing an expansible rubber collar on a member of greater external diameter than the normal bore of the collar comprising an open-ended sleeve having an unobstructed bore of substantially uniform diameter extending from end to end of the sleeve and being of greater internal diameter than the diameter of the member to which the collar is to be applied so as to completely slip over said member, said member being substantially longer than the length of the sleeve and said sleeve being movable to any position on the member, said sleeve having a concentric spaced outer wall connected to one end of the sleeve by an annular end wall and forming in cooperation therewith an annular cylinder, said sleeve being adapted to receive an expanded rubber collar, said outer wall being sufficiently spaced so as not to obstruct the reception of an expanded rubber collar on said sleeve, an annular piston in the cylinder space between the outer wall and the sleeve and engaging one end of the collar, said outer wall being of sufficient length to permit the piston moving within it to a point where the collar is moved far enough off the sleeve to permit the collar to engage said member and draw itself off said sleeve by its contraction, and means for admitting fluid under pressure to the cylinder space behind said piston for moving the piston to force the collar off of said sleeve and on to said member.

2. A device for installing an expansible rubber collar on a member of greater external diameter than the normal bore of the collar comprising an open-ended sleeve having an unobstructed bore of substantially uniform diameter extending from end to end of the sleeve and being of greater internal diameter than the diameter of the member to which the collar is to be applied so as to completely slip over said member, said member being substantially longer than the length of the sleeve and said sleeve being movable to any position on the member, said sleeve having a concentric spaced outer wall connected to one end of the sleeve by an annular end wall and forming in cooperation therewith an annular cylinder, said sleeve being adapted to receive an expanded rubber collar, said outer wall being sufficiently spaced so as not to obstruct the reception of an expanded rubber collar on said sleeve, an annular piston in the cylinder space between the outer wall and the sleeve and engaging one end of the collar, abutment means in the cylinder space between the sleeve and the outer wall for preventing engagement of the piston with the end wall, and means for admitting a fluid under pressure to the cylinder space behind the piston for moving the piston to force the collar off of said sleeve and on to said member.

BYRON H. BARNES.
BURT S. MINOR.